D. SALVATI.
SANITARY CART.
APPLICATION FILED AUG. 3, 1916.
1,255,649. Patented Feb. 5, 1918.
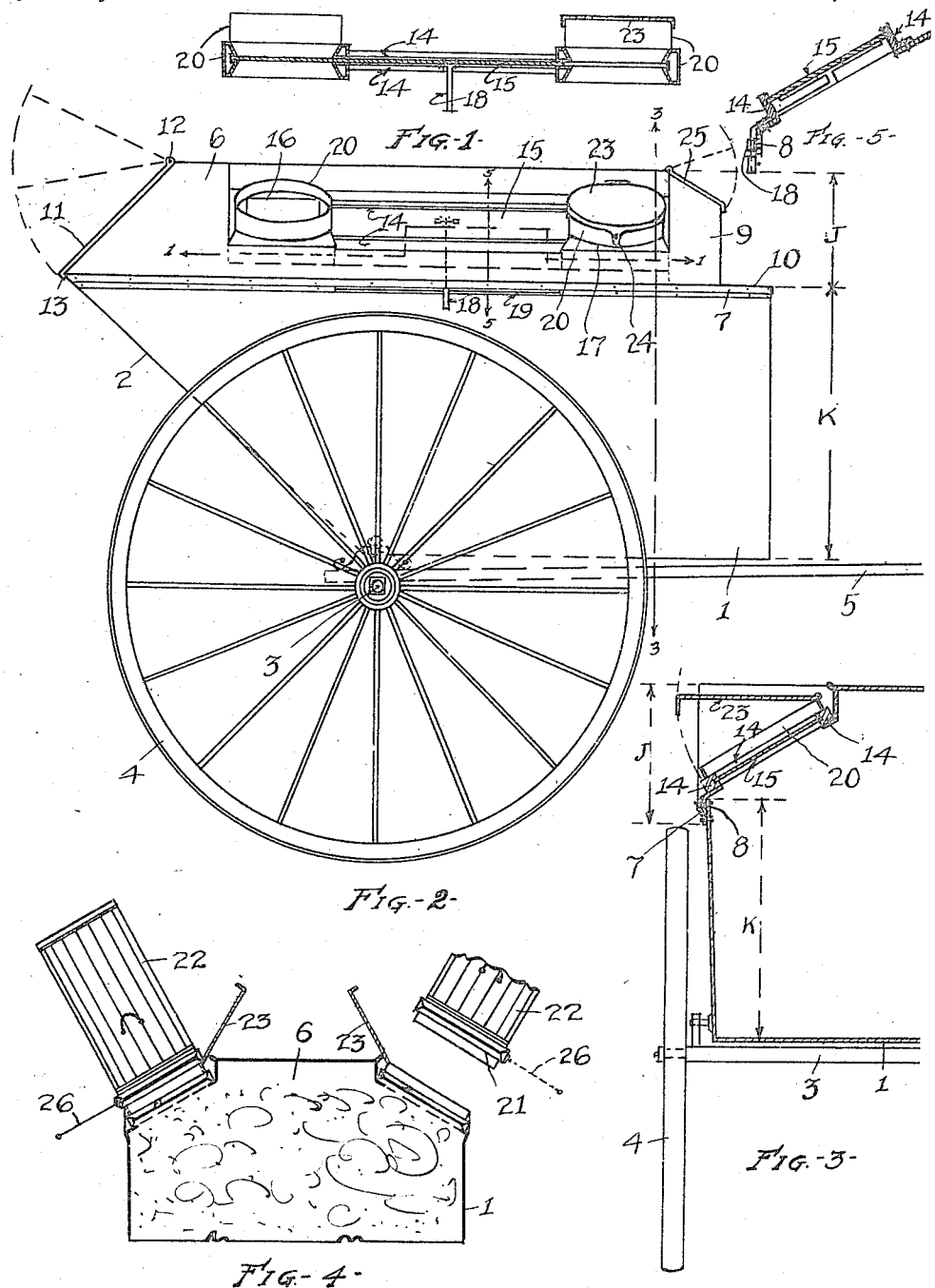
WITNESSES:
Philip N. Meagher
INVENTOR:
Dominick Salvati,
BY Chas. M. Chapman,
ATTORNEY.

UNITED STATES PATENT OFFICE.

DOMINICK SALVATI, OF BROOKLYN, NEW YORK.

SANITARY CART.

1,255,649.  Specification of Letters Patent.  Patented Feb. 5, 1918.

Application filed August 3, 1916. Serial No. 112,900.

*To all whom it may concern:*

Be it known that I, DOMINICK SALVATI, a citizen of the United States, residing in Brooklyn, county of Kings, and State of New York, have invented a new and useful Improvement in Sanitary Carts, of which the following is a description.

This invention has reference to vehicles and, particularly, to carts or wagons which are used for public service purposes.

My invention is particularly applicable to garbage-carts or carriers, ash-carts or carriers, and vehicles of similar nature, and among its objects may be noted the following: to provide a simple, durable, cheaply-constructed, effective and sanitary cart, or cover therefor, by medium of which the public trash may be dumped into the cart without contaminating the surrounding atmosphere; to provide a structure by means of which an ash or garbage can may be dumped into the cart without exposing the contents of the can or the cart; to provide a construction by means of which carts of the character noted may have applied thereto a means which will prevent dust from flying and odors from being emitted during the process of filling the cart; to provide means by which the load may be automatically distributed within the cart; and to provide means by which the interior of the cart may be raked or scraped, and the contents thereof quickly and readily dumped.

With the above objects in view, and others which will be detailed during the course of this description, my invention consists in the parts, features, elements and combinations thereof hereinafter described and claimed.

In order that my invention may be readily understood, I have provided drawings wherein:

Figure 1 is a sectional view of a portion of one side of the cover of a cart, the section being taken substantially on the line 1—1 of Fig. 2;

Fig. 2 is a side elevation of the body-portion of a dump-cart of usual construction, for public service purposes, having my invention applied thereto;

Fig. 3 is a section of a detail of construction substantially on the line 3—3 of Fig. 2;

Fig. 4 is a view of the upper portion of a cart and cover thereof showing diagrammatically merely the mode in which the can may be applied to, held by, and the contents dumped within, the cart; and Fig. 5 is a sectional detail, on an enlarged scale, substantially on the line 5—5 of Fig. 2.

Referring to the drawings, the numeral 1 indicates the body of a usual form of dump-cart, the rear end of which is usually inwardly inclined as at 2, and which body is usually mounted upon the wheel-axle 3, in approved manner for dumping, one of the wheels of the cart being indicated by 4, and one of the shafts by 5. My invention is applied to the top of the cart which, as indicated in Fig. 2, is of the normal height indicated by the line K to the point X, from which point the height of the cover is indicated by the extension of the said line K, as indicated at J.

The cover which embodies my invention is indicated, generally, by the numeral 6, said cover being secured to the top of the body of the cart, at opposite sides thereof, by means of a rigid strip 7, bolted to the outside of said body and providing between the latter and said strip a recess or groove on each side, in which the side flanges 8 of the cover 6 are set and bolted, thus securing the cover rigidly, but removably, to the top of the cart-body. The said top 6, on its opposite sides, is preferably depressed throughout an area extending from the back portion 9 of the seat 10 to within a short distance of the rear end of the cart, over which a lid 11 is applied by means of a hinge-connection 12 to the cover 6, the lower edge of the lid 11 being provided with a flange 13, which overlaps and engages frictionally the end of the cart, as clearly shown in Fig. 2. By thus applying the lid, the latter will automatically close when released and remain closed.

In the depressed portion, on each side of the cart-cover, guides or ways 14 are provided in parallel grooves of which a slide 15 is applied, said slide being sufficiently long to extend from the rear of one receiver 16 to the rear of the forward receiver 17, by this means one of the receivers being always closed by the slide 15. The slide is manipulated by means of a handle 18, Fig. 5, which may be of any suitable form and which will extend through the opening 19 at the base of the cover into position to be grasped by the driver. The said handle 18 is rigidly fixed to the bottom of the said cover 15, in any suitable manner, as shown in Fig. 5. Each of the receivers 16 and 17 is angular at its bottom and preferably square, and has extending upwardly from it a neck or flange 20, which is circular, or of a form to receive the neck or extension 21 on the filling-can 22, see Fig. 4. It is necessary to apply a hinged cover 23 to one only of the necks 20; but, a hinged cover may be applied to both of said necks 20, if desired. Any suitable means, as an ordinary latch or hasp 24, may be applied to the cover to fasten the same, when desired, and by means of which the cover may be lifted, when required.

As shown by Figs. 2 and 4, my cover 6 has two sets of receivers of two each, the same being disposed substantially at opposite ends of the cart, and the angular disposition of the receivers is such as to make it easy for the driver to lift the can to the receiver, tilt the can with its neck within the neck of the receiver, and leave it there until the emptying is completed. This is clearly shown in Fig. 2. This disposition of the receivers also enables the load to be properly distributed without any hand manipulation or raking of said load. However, at the forward end of the cart, the back 9 of the seat is provided with a hinged cover 25, which will automatically close by gravity, and remain closed. This cover may be lifted and a stick or hoe inserted therein, if it be found necessary, to either rake the load or scrape the inside of the cart after it is dumped. The hinged lid 11, when the cart is dumped, will automatically lift or fly open until the cart is emptied, when it will automatically close.

The operation of loading a cart which has my invention applied thereto is as follows:

A garbage or ash can having applied thereto an extension or neck corresponding in form to the extension or neck 20 of the receiver, but slightly smaller in diameter than said neck, and also provided with a sliding-cover 26, is lifted to the position shown at the left of Fig. 4 and is there allowed to remain. The handle 18 is then grasped by the driver who operates the slide, to open the receiver in the neck of which the can has been set. Thus the contents of the can may be deposited within the cart. The driver next slides the cover of the can, thus allowing the contents of the latter to slide into the cart. When the can is thus emptied, the cover 26 thereof is closed and then the slide 15 is shifted back to its original position, thus closing the receptacle. The can is now lifted, as shown in the right of Fig. 4, and deposited on the pavement or elsewhere. The cover 23 may then be closed over the receiver. During this process, neither odor nor dust has escaped from either the can or the cart and, in consequence, the surrounding atmosphere has not been polluted or defiled in any way.

I desire it distinctly understood that I am not to be confined to the particular details of construction shown in the drawings, as the said details are merely illustrative of a means by which I may provide a sanitary cover for carts of all kinds. In my claims, I purpose using terms which are expressive of various other forms which may be employed and which I now have in contemplation; but, which I deem unnecessary to illustrate or mention herein, since the form shown discloses clearly the broad idea of means of my invention.

Having thus described my invention, what I claim and desire to secure by Letters Patent is:

1. A cover for carts comprising a central raised body-portion and an inclined side portion depressed below the body-portion and extending lengthwise of the cover, the depressed portion having oppositely-arranged guides; a receiver disposed at each end of the depression; a slide coöperating with said guides; and means for causing said slide to be shifted in the guides to close one or the other of said receivers.

2. In combination with a cart having an unbroken body and an outwardly and upwardly inclined rear end, a cover having means through which the cart may be loaded at both sides, detachably secured to said cart, said cover having a downwardly and outwardly inclined rear end provided with an opening extending to the upper end of the inclined cart end, and an outwardly swinging, gravital lid carried by said cover for closing said opening, which will automatically swing open when the cart is dumped and automatically close when the cart is reset for use.

DOMINICK SALVATI.